United States Patent
Patil et al.

(10) Patent No.: US 10,694,558 B2
(45) Date of Patent: Jun. 23, 2020

(54) SYSTEM, METHOD AND APPARATUS FOR SMALL CELL GATEWAY SELECTIVE DATA PATH OFFLOAD

(71) Applicant: CISCO TECHNOLOGY, INC., San Jose, CA (US)

(72) Inventors: Santosh Ramrao Patil, San Jose, CA (US); Anton Okmyanskiy, Vancouver (CA); Akhtar Iqbal, Santa Clara, CA (US); Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 141 days.

(21) Appl. No.: 14/944,008

(22) Filed: Nov. 17, 2015

(65) Prior Publication Data

US 2016/0270132 A1    Sep. 15, 2016

Related U.S. Application Data

(60) Provisional application No. 62/126,692, filed on Mar. 1, 2015.

(51) Int. Cl.
*H04W 76/12*    (2018.01)
*H04W 76/11*    (2018.01)

(52) U.S. Cl.
CPC ............ *H04W 76/12* (2018.02); *H04W 76/11* (2018.02)

(58) Field of Classification Search
CPC . H04W 76/021; H04W 76/022; H04W 76/12; H04W 76/11
See application file for complete search history.

(56) References Cited

U.S. PATENT DOCUMENTS

| | | | |
|---|---|---|---|
| 8,340,081 B2 | 12/2012 | Salkintzis et al. | |
| 8,611,901 B2 | 12/2013 | Pazhyannur et al. | |
| 8,665,721 B2 | 3/2014 | Ang et al. | |
| 8,693,367 B2 | 4/2014 | Chowdhury et al. | |
| 8,730,831 B2 | 5/2014 | Wang et al. | |
| 2007/0213058 A1* | 9/2007 | Shaheen | H04W 36/12 455/436 |

(Continued)

OTHER PUBLICATIONS

BellSouth, SBC, "Geran A, Enhanced-A, and Iu-cs Interfaces," GAHW#2 (00)0066, 3GPP TSG-GERAN Ad Hoc Meeting #2, Oct. 9-13, 2000 Munich, Germany; 8 pages.

(Continued)

*Primary Examiner* — Khaled M Kassim
(74) *Attorney, Agent, or Firm* — Patterson + Sheridan, LLP

(57) ABSTRACT

An example method is provided in one example embodiment and includes receiving an assignment request from a core node in a network to establish a tunnel for user plane traffic; forwarding first parameters to a controller of an enterprise network, wherein the first parameters include a tunnel identifier and a network address associated with the core node; receiving an assignment response; and forwarding second parameters to the core node, wherein the second parameters include a tunnel identifier and a network address associated with the controller. In some instances, the assignment request can be a request to establish a tunnel for user plane data traffic. In some instances, the assignment request can be a request to establish a tunnel for user plane voice traffic.

20 Claims, 7 Drawing Sheets

(56) References Cited

U.S. PATENT DOCUMENTS

| | | | | |
|---|---|---|---|---|
| 2007/0213060 | A1* | 9/2007 | Shaheen | H04W 36/10 455/436 |
| 2007/0248064 | A1* | 10/2007 | Shaheen | H04W 60/04 370/338 |
| 2008/0013553 | A1* | 1/2008 | Shaheen | H04W 76/022 370/401 |
| 2008/0037468 | A1* | 2/2008 | Zisimopoulos | H04W 76/002 370/331 |
| 2009/0129342 | A1* | 5/2009 | Hwang | H04W 36/0022 370/331 |
| 2010/0041405 | A1* | 2/2010 | Gallagher | H04W 8/02 455/436 |
| 2010/0061340 | A1* | 3/2010 | Ramle | H04W 36/12 370/331 |
| 2010/0208658 | A1* | 8/2010 | Vesterinen | H04W 8/082 370/328 |
| 2010/0278122 | A1* | 11/2010 | Singh | H04L 69/16 370/329 |
| 2010/0322068 | A1* | 12/2010 | Grahn | H04W 76/11 370/217 |
| 2011/0170469 | A1 | 7/2011 | Watfa et al. | |
| 2011/0267963 | A1* | 11/2011 | Xu | H04W 36/0011 370/242 |
| 2012/0030143 | A1 | 2/2012 | Chen et al. | |
| 2012/0044825 | A1 | 2/2012 | Zisimopoulos et al. | |
| 2012/0076120 | A1* | 3/2012 | Kovvali | H04W 76/021 370/338 |
| 2013/0016696 | A1* | 1/2013 | Adjakple | H04W 76/025 370/331 |
| 2013/0301610 | A1 | 11/2013 | Ali et al. | |
| 2014/0064209 | A1* | 3/2014 | Anchan | H04W 72/0406 370/329 |
| 2014/0071925 | A1 | 3/2014 | Liu | |
| 2015/0180945 | A1* | 6/2015 | Hall | H04W 4/20 709/203 |

OTHER PUBLICATIONS

Cisco Systems, Inc., "HNB-GW Administration Guide, StarOS Release 16," Mar. 27, 2015; 153 pages.

Cisco Systems, Inc., "IuPS Service Configuration Mode Commands," SGSNIuPSSvcConfig Support, SGSN Administration Guide, StarOS Release 20, Aug. 8, 2016; 18 pages.

Cisco Systems, Inc., "Cisco Universal Small Cell Solution: A Platform for Service Innovation," Solution Overview, Feb. 2015; 12 pages.

"3GPP TS 25.410 V10.2.0 (Jun. 2011) Technical Specification: $3^{rd}$ Generation Partnership Project; Technical Specification Group Radio Access Network; UTRAN Iu Interface; general aspects and principles (Release 10)," 3GPP, 650 Route des Lucioles—Sophia Antipolis Valbonne—France, Jun. 2011; 29 pages.

"ETSI TS 125 467 V12.3.0 (Jan. 2015) Technical Specification: Universal Mobile Telecommunications System (UMTS); UTRAN architecture for 3G Home Node B (HNB); Stage 2 (3GPP TS 25.467 version 12.3.0 Release 12)," ETSI, 650 Route des Lucioles—Sophia Antipolis Valbonne—France, Jan. 2015; 93 pages.

"ETSI TS 125 413 V12.4.0 (Apr. 2015) Technical Specification: Universal Mobile Telecommunications System (UMTS); UTRAN Iu interface Radio Access Network Application Part (RANAP) signaling (3GPP TS 25.413 version 12.4.0 Release 12)," ETSI, 650 Route des Lucioles—Sophia Antipolis Valbonne—France, Apr. 2015; 432 pages.

"ETSI TS 129 060 V12.9.0 (Jul. 2015) Technical Specification: Digital cellular telecommunications system (Phase 2+); Universal Mobile Telecommunications System (UMTS); General Packet Radio Service (GPRS); GPRS Tunnelling Protocol (GTP) across the Gn and Gp interface (3GPP TS 29.060 version 12.9.0 Release 12)," ETSI, 650 Route des Lucioles—Sophia Antipolis Valbonne—France, Jul. 2015; 182 pages.

"Signalling Connection Control Part," from Wikipedia, the free encyclopedia, Apr. 10, 2015; 4 pages.

* cited by examiner

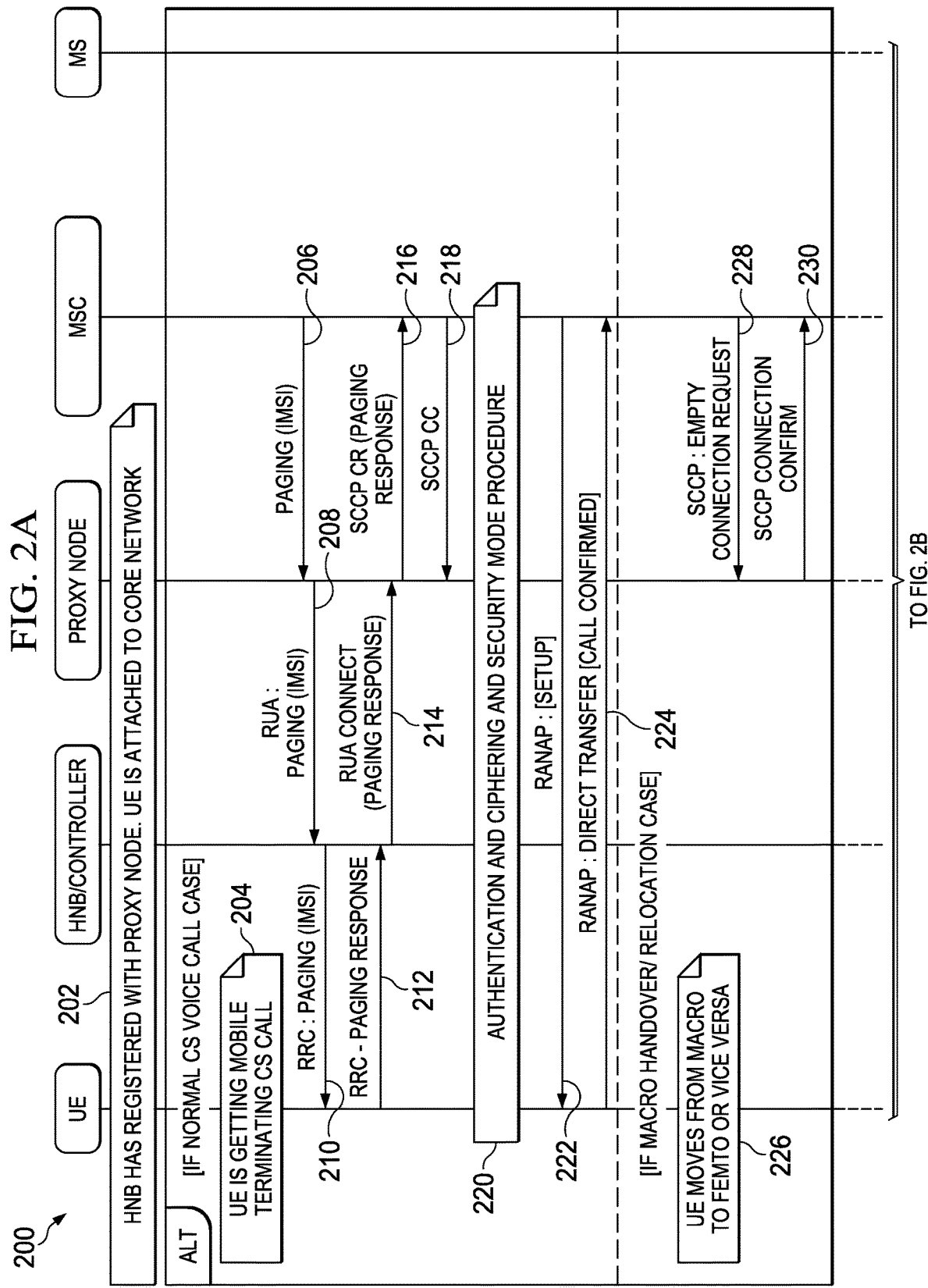

SYSTEM, METHOD AND APPARATUS FOR SMALL CELL GATEWAY SELECTIVE DATA PATH OFFLOAD

CROSS-REFERENCE TO RELATED APPLICATION

This application claims the benefit of priority under 35 U.S.C. § 119(e) to U.S. Provisional Application Ser. No. 62/126,692 entitled "SYSTEM, METHOD AND APPARATUS FOR SMALL CELL GATEWAY SELECTIVE DATA PATH OFFLOAD," filed Mar. 1, 2015, which is hereby incorporated by reference in its entirety.

TECHNICAL FIELD

This disclosure relates in general to the field of computer networking, and more particularly, to a system, method and apparatus for small cell gateway selective data path offload.

BACKGROUND

Computer devices can enable users to communicate with other users operating other computer devices and to communicate with other computer devices all over the world via, for example, the Internet. Computer networks that facilitate these communications generally rely on many different technologies. These technologies generally rely upon three basic components: a data plane, a control plane, and a management plane. The data plane carries the user traffic, while the control plane and the management plane serve the data plane. The data plane produces significantly more traffic than the other planes. As network traffic increases, the capacity of network elements receiving the data plane traffic can decrease. Also, scaling can become more difficult as the amount of network traffic increases. In addition, deployed virtualized solutions generally have specific capacity limitations. Managing a network and the capacity of individual network elements presents significant challenges to network operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-2B are an interaction diagram illustrating example interactions between components of the data offload architecture in accordance with at least one embodiment;

DETAILED DESCRIPTION OF EMBODIMENTS

Overview

Figure 1:
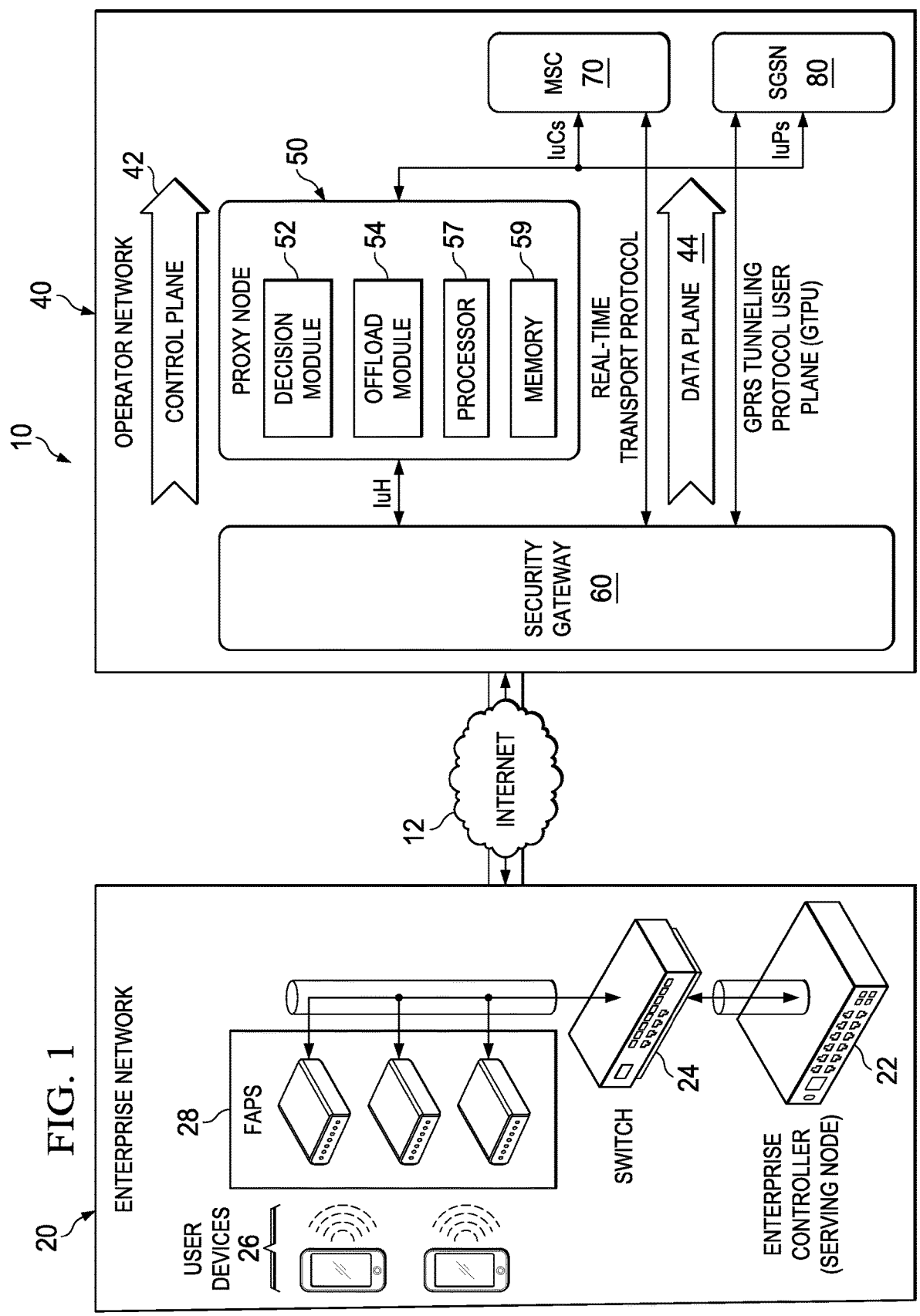
FIG. 1 is a simplified block diagram of a data offload architecture for selectively offloading data plane traffic in accordance with at least one embodiment.

A method is provided in one example embodiment and may include receiving an assignment request from a core node in a network to establish a tunnel for user plane traffic; forwarding first parameters to a controller of an enterprise network, wherein the first parameters include a tunnel identifier and a network address associated with the core node; receiving an assignment response; and forwarding second parameters to the core node, wherein the second parameters include a tunnel identifier and a network address associated with the controller.

In some instances, the assignment request can be a request to establish a tunnel for user plane data traffic. In such instances, the core node can be a Serving General Packet Radio Service (GPRS) Support Node (SGSN). In other instances, the assignment request can be a request to establish a tunnel for user plane voice traffic. In such instances, the core node can be a Mobile Switching Center (MSC). In some cases, the tunnel identifier and the network address can be included in the assignment request. In still some cases, the assignment request can be a Radio Access Bearer (RAB) Release Request.

Another method is provided in another example embodiment and may include receiving, at a proxy node, a request message from a core node in a network; determining whether the request message is an assignment request or a relocation request; selecting parameters to be forwarded to a controller in an enterprise network based on the determination; and forwarding the selected parameters to the controller.

In some cases, when the determining indicates the request message is an assignment request, the method can include selecting a tunnel identifier and a network address associated with the core node to be forwarded to the controller. In other cases, when the determining indicates the request message is a relocation request, the method can include selecting a tunnel identifier and a network address associated with the proxy node to be forwarded to the controller. In some instances, the tunnel identifier and the network address can be included in the request message. In still some instances, the tunnel identifier can be associated with a General Packet Radio Service Tunneling Protocol User Plane (GTPU) tunnel for secure communications.

Example Embodiments

For purposes of understanding certain embodiments of systems disclosed herein, it is important to appreciate the technologies and data that may be associated with network communications. The following foundational information may be viewed as a basis from which the present disclosure may be properly explained.

User plane data packet handling consumes a significant amount of compute resources in a 3G/4G core network. The data packet throughput often defines the capacity of core nodes like Serving General Packet Radio Service (GPRS) Support Node (SGSN), Gateway GPRS Support Node (GGSN), Mobility Management Entity (MME), Serving Gateway (SGW) & Packet Data Network Gateway (PGW). In case of 3G small cells (e.g., Femtocell, Home Node-B (HNB)), there is an additional aggregation/proxy node in the form of Small Cell Gateway (HNB-GW). The HNB-GW connects HNBs to the 3G Core, which includes a Mobile Switching Center (MSC) and an SGSN (both of which are referred to herein as 'core nodes'). The MSC and SGSN may facilitate access to network resources.

The HNB-GW handles both 3G control/signaling and data traffic. The data throughput handling capacity of the HNB-GW presents an additional bottleneck to network scalability. This presents a significant cost overhead in deployments in which the HNB-GW is provided using specialized hardware (HW) and especially in virtualized deployment environments.

Third Generation Partnership Project (3GPP) standards suggest that an HNB-GW acts as proxy in all cases for 3G data path handling. In 4G architecture, the S1-U (data traffic) can be offloaded directly from a HeNB to an SGW, providing an option to bypass a Home eNode B Gateway (HeNBGW or HeNB-GW). However, the data path handling issue persists in 3G networks.

Normally, the HNB-GW adds value as proxy node between the Home Node-B and MSC/SGSN data path in cases of handover scenarios. Handover scenarios can include femtocell to femtocell (F2F) handovers, femtocell to macrocell (F2M) handovers, and macrocell to femtocell (M2F) handovers. During F2F handovers, the HNB-GW shields MSC/SGSN from frequent path switch-overs.

However, in case of a 3G small cell enterprise deployment with a controller-based architecture, such as can be provided using Universal Small Cell 8000 series FAPs (USC8K FAPs), as developed by Cisco Systems, Incorporated, F2F handover within an enterprise is handled locally at a controller without involvement of the HNB-GW or the MSC/SGSN. So, in a controller-based architecture, the HNB-GW doesn't add value in data path handling for F2F handover because these events are transparent to the HNB-GW and the MSC/SGSN. For M2F and F2M handovers, however, the HNB-GW still adds value. Thus, what is needed is a system and method to provide selective data path offload from an HNB-GW that can still handle M2F and F2M data path switchover.

An architecture as shown and described with reference to FIG. 1, can solve all of these problems (and more). FIG. 1 is a simplified block diagram illustrating an architecture 10 configured to enable selectively offloading data plane traffic. Architecture 10 includes an enterprise network 20 and an operator network 40 communicating via the Internet 12. In operator network 40, three 3GPP interfaces are shown. A 3GPP HNB interface 'IuH' between proxy node 50/security gateway 60 and controller 22. A 3GPP interface IuCs is between proxy node 50/security gateway 60/controller 22 and MSC 70. A 3GPP interface IuPs is between proxy node 50/security gateway 60/controller 22 and SGSN 80. An enterprise could be any type of entity receiving network services from a service provider. Enterprises can include, but are not limited to, businesses, corporations, government entities, schools, hospitals, event venues, convention centers, shopping centers, retail merchants, restaurants, etc. The operator network could be the network of a service provider that provides network access services to the enterprise.

Enterprise network 20 includes a controller (or serving node) 22, a switch 24, and femtocell access points (FAPs) 28. Switch 24 could be a Power over Ethernet (PoE) switch in at least one example. Multiple user devices 26 or user equipment (UE) (e.g., smart phones, tablets, laptops, etc.), sometimes referred to as mobile stations, may connect to the enterprise network via FAPs 28. Network sessions may be established between these user devices and other nodes, in which data plane traffic is sent through enterprise network 20 and operator network 40.

Operator network 40 includes a security gateway 60 a mobile switching center (MSC) 70, and a serving GPRS support node (SGSN) 80. A proxy node 50 is between security gateway 60 and MSC 70 and SGSN 80. In at least one embodiment, proxy node 50 is configured as a Home Node-B Gateway (HNB-GW), and includes a decision module 52, an offload module 54, at least one processor 57, and at least one memory 59. In addition, the paths of control plane 42 and data plane 44 of network traffic are shown. It should be noted that references to HNB-GW (or HNBGW) herein, including in the FIGURES, are intended to describe operations, features, characteristics, communications, configuration, etc. of proxy node 50 in possible embodiments.

Proxy node 50, controller 22 and security gateway 60 can exchange communications via the IuH interface. In one embodiment, proxy node 50 and security gateway 60 can be deployed as separate devices, as shown in FIG. 1. In another embodiment, proxy node 50 and security gateway 60 can be deployed as a common device. In at least one embodiment, FAPs 28 can perform Internet Protocol (IP) security (IPsec) communication link set-ups with security gateway 60 in order to protect communications between FAPs 28, controller 22, security gateway 60, proxy node 50, MSC 70 and SGSN 80. In general, IPsec can use cryptographic security services to protect communications over IP networks. In various embodiments, IPsec can support network-level peer authentication, data origin authentication, data integrity, data confidentiality (encryption), combinations thereof or the like. In at least one embodiment, security gateway 60 can perform authentication of each FAP 28 and obtain an assigned IPsec (or, more generally, an IP address) for each of FAP from an IP assignment server (not shown), which could be a separate dynamic host configuration protocol (DHCP) server, a local service on executing on security gateway 60, another IP assignment entity, etc. In various embodiments, IP addresses as discussed herein can include IP version 4 (IPv4) or IP version 6 (IPv6) IP addresses, depending on deployment configuration.

Embodiments disclosed herein allow proxy node 50 to be offloaded of most data path traffic in a controller-based architecture 10. Proxy node 50 can still handle data traffic during M2F and F2M handovers. The configuration of proxy node 50 and its logic (e.g., decision module 52 and offload module 54) enables this offload without functional changes to existing core network nodes (e.g., MSC 70 and SGSN 80) or controller 22. In at least one embodiment, only proxy node 50 is configured with logic to achieve this functionality, in addition to new network routes being created to allow core network nodes (e.g., MSC 70 and SGSN 80) to reach security gateway subnets.

Figure 2B:
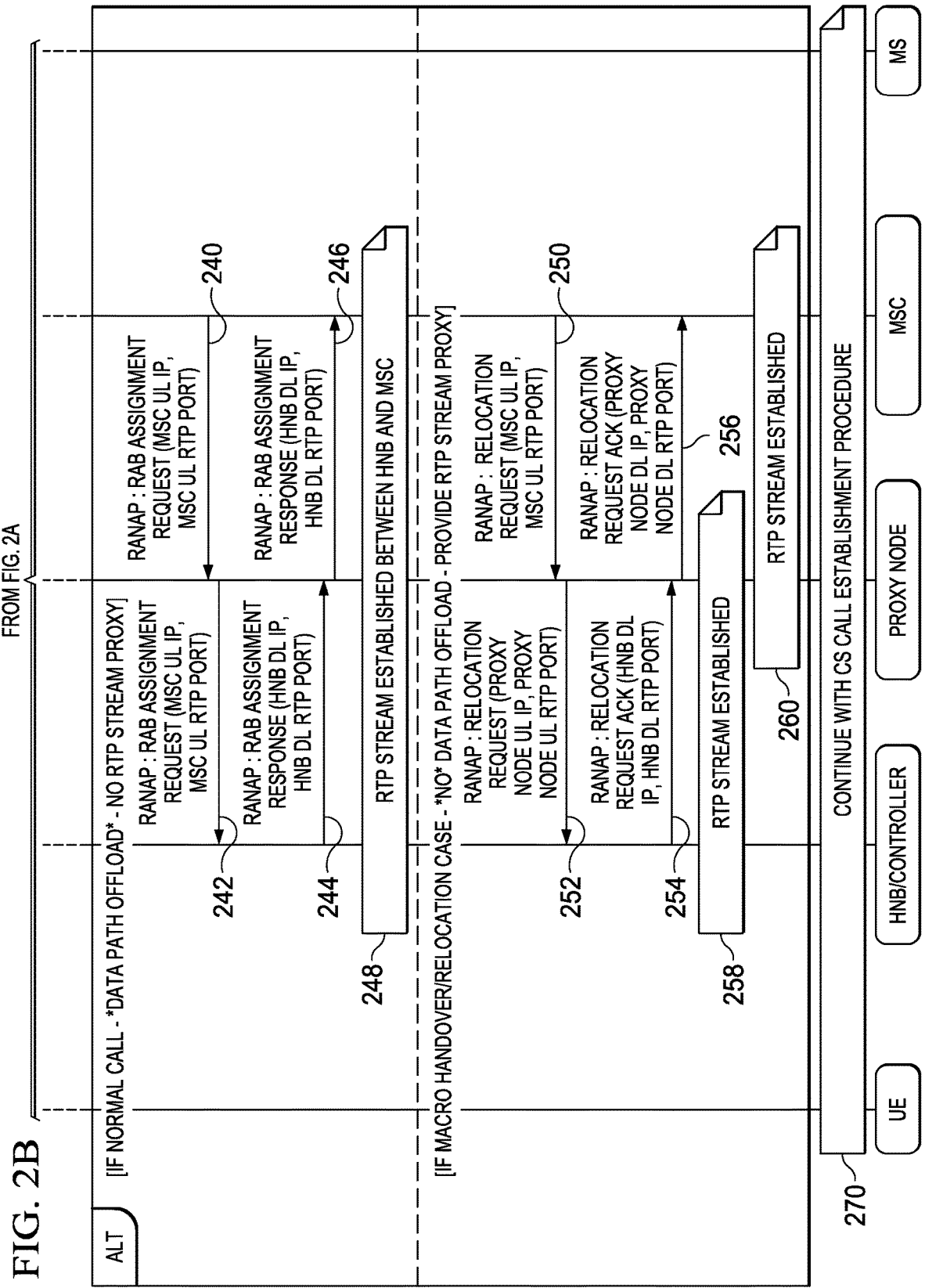

Referring to FIGS. 2A-2B, FIGS. 2A-2B are an interaction diagram 200 illustrating example interactions between elements of architecture 10 in accordance with at least one embodiment related to voice communications. In a voice (CS) call, a real-time transport protocol (RTP) stream is involved for transporting data communications. FIGS. 2A-2B include a given UE (e.g., any UE 26), a given HNB (e.g., any FAP 28), an enterprise controller (e.g., controller 22), a proxy node (e.g., proxy node 50), an MSC (e.g., MSC 70) and a mobile station (MS) (e.g., another UE 26). According to one embodiment, proxy node 50 provides an RTP IP address and an RTP port identity of MSC 70 to controller 22 and vice-versa, so that controller 22 and MSC 70 can directly send the RTP stream and bypass proxy node 50, as shown at 240-248 and discussed in further detail herein. Proxy node 50 can still receive streams in M2F or F2M handover scenarios as shown at 250-260.

For the embodiment shown in FIGS. 2A-2B, it is assumed at 202 that HNB/controller (e.g., a FAP 28/controller 22) has registered with proxy node 50 and the UE is attached to the core network (e.g., MSC 70). Interactions 204-224 illustrate various 3GPP standards-based interactions for a normal CS voice call case. Interactions 204-224 can occur regardless of whether or not traffic is offloaded from proxy node 50. At 204, it is assumed that a particular UE (e.g., a particular user device 26) is to receive a Mobile Terminating (MT) CS (e.g., voice) call from another mobile station (MS) (e.g., from another user device 26). At 206, MSC 70 initiates paging for the International Mobile Subscriber Identity (IMSI) associated with the subscriber for the UE. At 208, proxy node 50 relays the paging to the HNB/controller using standards-based Radio Access Network Application Part (RANAP) User Adaptation (RUA) messaging. At 210, the HNB/controller relays the paging to the UE using standards-based Radio Resource Control (RRC) messaging. At 212, the UE sends an RRC paging response to the HNB/controller, which is relayed to proxy node 50 via a RUA connect paging response from the HNB/controller at 214. At 216, proxy node 50 relays the paging response to MSC 70 using standards-based Signaling Connection Control Part (SCCP) Connection Request (CR) messaging. MSC 70 sends proxy node 50 an SCCP Connection Confirmation (CC) at 218 confirming the connection to the UE. Additional standards-based authentication, ciphering and security mode procedures are performed at 220 and at 222 RANAP setup messaging is communicated to the UE. At 224, a RANAP direct transfer call confirmation is communicated from the UE to MSC 70.

An example data path offload case is shown in interactions 240-248 and a non-data path offload case is shown in interactions 228-230 and 250-260. Consider, for example, that proxy node 50 receives a RANAP RAB Assignment Request from MSC 70, as shown at 240. The RAB Assignment Request can include the MSC uplink (UL) IP address and an MSC UL RTP port identity (ID) for MSC 70. The Request can also include one or more bearer identity(s) (ID(s)) for one or more bearer(s) for the UE. As defined in 3GPP TS 25.413, a RAB Assignment Request/Response Information Element or a Relocation Request/Relocation Request Acknowledgement (ACK) can include one or more Information Elements (IE) including transport Transport Layer information. Transport Layer information can include a Transport Layer Address (e.g., UL or DL IP address), a Tunnel Endpoint Identifier (TEID) (e.g., UL or DL GTPU tunnel ID) or a binding ID (e.g., UL or DL RTP port ID). An RTP port ID can also be referred to herein as an RTP port number. In various embodiments, RTP port numbers can range from 5000 to 65535. As defined in 3GPP TS 29.060, a data plane TEID IE can include a type identifier specifying the IE type and a TEID for data transmissions requested by the receiver of a given flow.

Upon receiving the RANAP RAB assignment request, decision module 52 for proxy node 50 determines the type of RANAP message received. For the present example case, the RANAP message is a type RAB Assignment Request, which causes decision module 52 to determine that a data offload path is to be established such that the data stream associated with the RAB is to be offloaded from proxy node 50.

At 242, proxy node 50, via offload module 54, forwards the RANAP RAB Assignment Request message to the HNB/controller including in the message the MSC UL IP address and the MSC UL RTP port identity, rather than supplying the UL IP address and UL RTP port identity for proxy node 50 within the RAB Assignment Request messaging. At 244, the HNB/controller generates a RANAP RAB Assignment Response message that includes the HNB downlink (DL) IP address and an HNB DL RTP port identity for the HNB for downlink UE communications.

Upon receiving the RAB Assignment Response message at 246, proxy node 50, via offload module 54, can forward the RAB Assignment Response message to MSC 70 including the HNB DL IP address and the HNB DL RTP port identity, rather than supplying the DL IP address and DL RTP port identity for proxy node 50 within the RAB Assignment Response messaging. In some embodiments, proxy node 50 can make another determination using decision module 52 as to whether or not to substitute a DL IP address and DL RTP port identity for proxy node 50 upon receiving RANAP messaging from the HNB/controller (e.g., making another determination based on RANAP message type). In other embodiments, proxy node 50, after previously making the decision to offload the data stream following the messaging at 240, can store an association between one or more bearer ID(s) for the UE included in the previously received RAB Assignment Request and the decision to offload the data stream for the bearer. In such embodiments, upon receiving the RAB Assignment Response from the HNB/controller, proxy node 50 can query the one or more bearer ID(s) included in the Response to determine that the RTP stream is to be offloaded and can forward the Assignment Response message to MSC 70 including the HNB DL IP address and HNB DL RTP port identity. In some embodiments, the one or more bearer ID(s) can further be associated with an ID for a given UE/subscriber (e.g., IMSI). In various embodiments, decision module 52 and/or offload module 54 can perform operations associated with a bearer ID query. As shown at 248, the RTP stream is established between the HNB and the MSC.

If there is a case in which the UE is involved in a macrocell handover or relocation, for example, if the UE moves from a macrocell to a femtocell or vice-versa, as shown at 226, then MSC 70 sends an SCCP empty connection request (e.g., containing no SCCP parameters) as shown at 228. At 230, proxy node 50 sends an SCCP connection confirmation to MSC 70. For the macrocell handover/relocation case, proxy node 50 can serve as an RTP stream proxy between the HNB/controller and MSC 70. As shown at 250, MSC 70 communicates a RANAP Relocation Request (Req) message to proxy node 50 including the MSC uplink (UL) IP address and an MSC UL RTP port identity. The Relocation Request message can also include one or more bearer ID(s) for one or more bearer(s) of the UE.

Upon receiving the RANAP message, proxy node 50, via decision module 52, determines the type of RANAP message received. For the present example case, the RANAP message type is a Relocation Request, which causes decision module 52 to determine that no data offload path should be established for the RTP stream. Rather proxy node 50 can serve as a proxy for the RTP stream.

At 252, proxy node 50 forwards the RANAP Relocation Request message to the HNB/controller including in the message the UL IP address and UL RTP port identity for proxy node 50. At 254, the HNB/controller generates a RANAP Relocation Request Acknowledgment (ACK) message that includes the HNB downlink (DL) IP address and an HNB DL RTP port identity for the HNB.

Upon receiving the RANAP Relocation Request ACK message at 256, proxy node 50 forwards the RANAP Relocation Request ACK message to MSC 70 including the DL IP address and the DL RTP port identity for proxy node 50. In some embodiments, proxy node 50 can make another determination using decision module 52 as to whether or not to substitute the DL IP address and DL RTP port identity for proxy node 50 upon receiving RANAP messaging from the HNB/controller (e.g., making another determination based on RANAP message type). In other embodiments, proxy node 50, after previously making the decision to not offload the data stream following the messaging at 250 can store an association between one or more bearer identity(s) (ID(s)) for the UE included in the RANAP Relocation Request and the decision not to offload the data stream for the bearer(s). In such embodiments, upon receiving the RANAP Relocation Request ACK from the HNB/controller, proxy node 50 can query the one or more bearer ID(s) for the UE (e.g., based on a stored association of one or more bearer ID(s)) included in the Relocation Request ACK message to determine that the RTP stream is not to be offloaded and can forward the Relocation Request ACK message to MSC 70 including the DL IP address and DL RTP port identity for proxy node 50. In some embodiments, one or more bearer ID(s) can further be associated with an ID for a given UE/subscriber (e.g., IMSI). In various embodiments, decision module 52 and/or offload module 54 can perform operations associated with a bearer ID query. As shown at 258, an RTP stream is established between the HNB and the proxy node and at 260 an RTP stream is established between the proxy node and the MSC.

For either an offload case or a non-offload case, the standards-based CS call establishment procedure can continue at 270 and the MT call to the UE can be established.

Figure 3A:
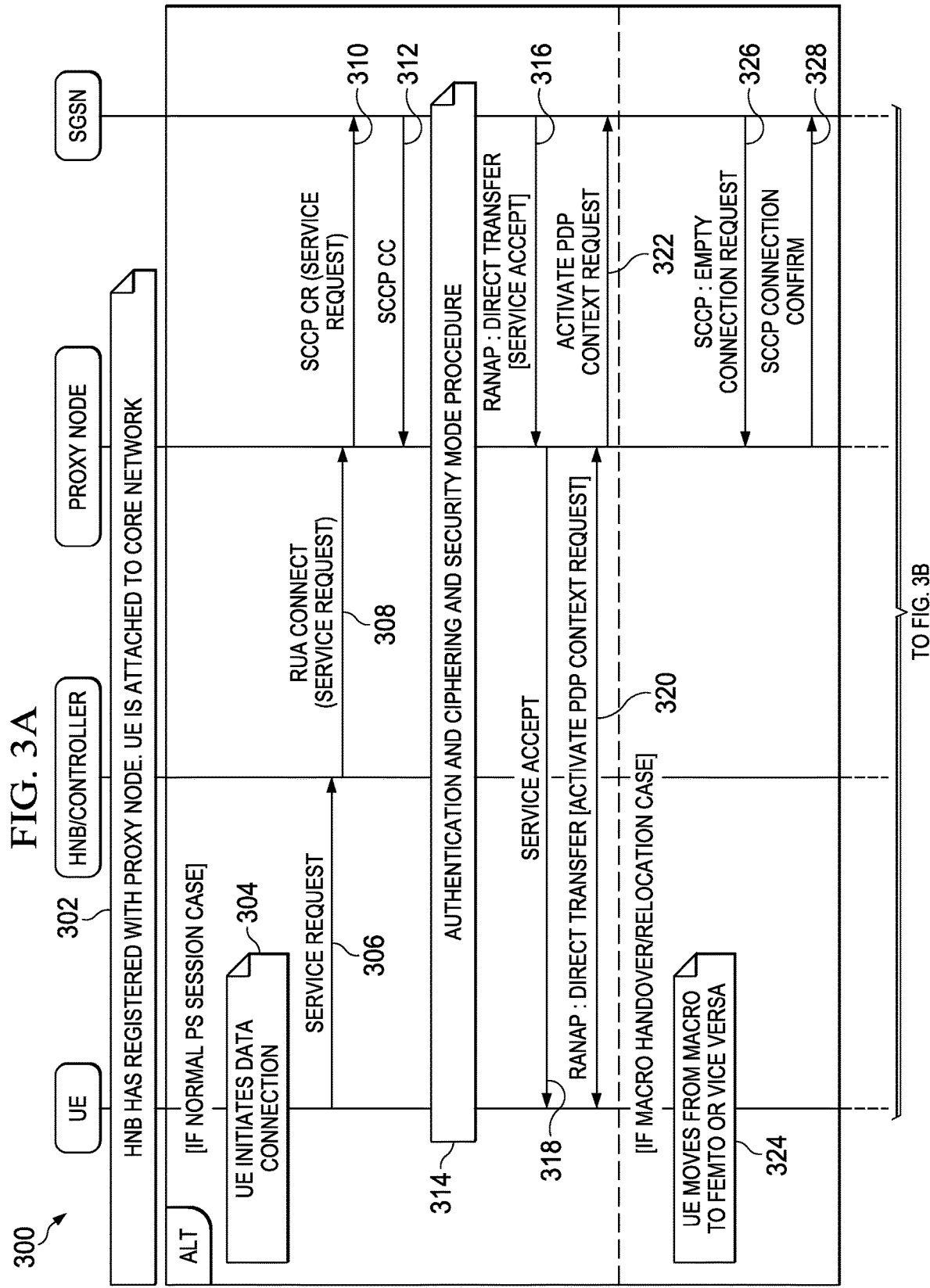
FIGS. 3A-3B are an interaction diagram illustrating example interactions between components of the data offload architecture in accordance with at least one embodiment.
Figure 3B:
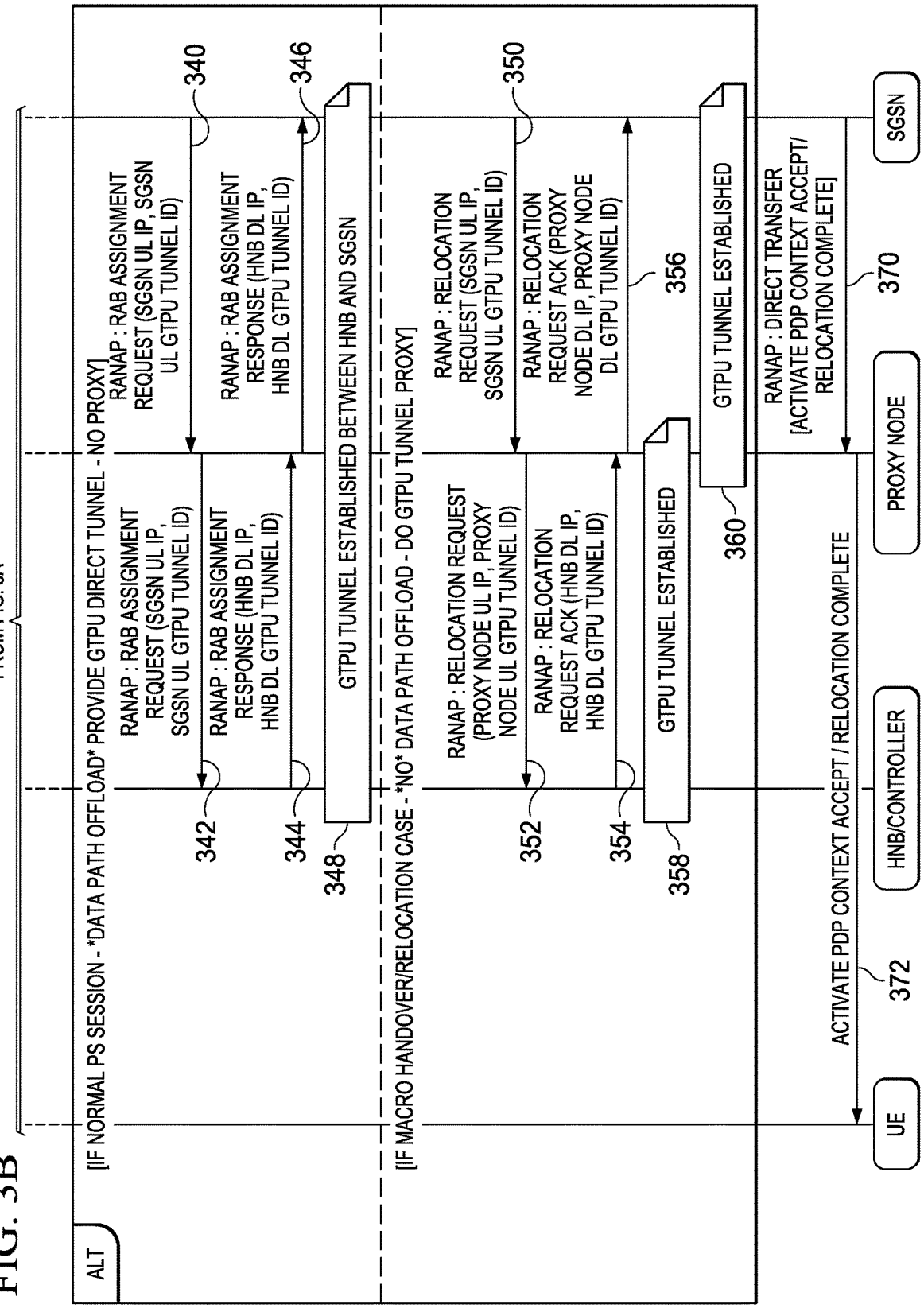

Referring to FIGS. 3A-3B, FIGS. 3A-3B are an interaction diagram 300 illustrating example interactions between elements of architecture 10 in accordance with at least one embodiment related to data communications. In a data (PS) session, a GPRS tunneling protocol user plane (GTPU tunnel) is involved for transporting data communications. FIGS. 3A-3B include a given UE (e.g., any UE 26), a given HNB (e.g., any FAP 28), an enterprise controller (e.g., controller 22), a proxy node (e.g., proxy node 50), and an SGSN (e.g., SGSN 80). According to one embodiment, proxy node 50 provides a GTPU IP address and a tunnel ID of SGSN 80 to controller 22 and vice-versa, so that controller 22 and SGSN 80 can directly send GTPU packets and bypass proxy node 50, as shown at 340-348 and discussed in further detail herein. Proxy node 50 can still act as a GTPU tunnel proxy for M2F or F2M handovers. In some embodiments, for example in error handling cases of PS data GTPU error handling for an out-of-sync GTPU tunnel, SGSN 80 can send a RAB Release Request to proxy node 50, which can be forwarded to controller 22 and controller 22 can release that specific out-of-sync GTPU tunnel.

For the embodiment shown in FIGS. 3A-3B, it is assumed at 302 that HNB/controller (e.g., a FAP 28/controller 22) has registered with proxy node 50 and that the UE is attached to the core network (e.g., SGSN 80). Interactions 304-322 illustrate various 3GPP standards-based interactions for a normal PS session case. Interactions 304-322 can occur regardless of whether or not traffic is offloaded from proxy node 50. At 304, it is assumed that a particular UE (e.g., a particular user device 26) initiates a data (PS) connection and at 306 sends a service request to the HNB/controller. At 308, the HNB/controller sends an RUA connect message to proxy node 50 for the service request. At 310, proxy node sends an SCCP CR message to SGSN 80 for the service request. At 312, SGSN 80 responds with an SCCP CC message and at 314 additional standard authentication, ciphering and security mode procedures are performed. At 316, SGSN 80 sends a RANAP direct transfer service acceptance messaging to proxy node 50. At 318, proxy node 50 sends service accept messaging to the UE via the HNB/controller. At 320, the UE responds with RANAP direct transfer messaging including an activate Packet Data Protocol (PDP) context request sent to proxy node 50. At 322, proxy node 50 sends the PDP context request to SGSN 80.

An example data path offload case is shown at 340-348. Consider, for example, that proxy node 50 receives a RANAP RAB Assignment Request from SGSN 80, as shown at 340. The message can include the SGSN uplink (UL) IP address and an SGSN UL GTPU tunnel identity (ID) for SGSN 80. The RAB Assignment Request can also include one or more bearer ID(s) for one or more bearer(s) for the UE. Upon receiving the RANAP RAB Assignment Request message, decision module 52 for proxy node 50 determines the type of RANAP message received. For the present example case, the RANAP message is a type RAB Assignment Request, which causes decision module 52 to determine that a data offload path is to be established such that the data tunnel associated with the RAB is to be offloaded from proxy node 50 to create a direct GTPU tunnel between the HNB/controller and SGSN 80.

At 342, proxy node 50, via offload module 54, forwards the RANAP RAB Assignment Request message to the HNB/controller including in the message the SGSN UL IP address and the SGSN UL GTPU tunnel ID, rather than supplying an UL IP address and UL GTPU tunnel ID for proxy node 50 within the RAB Assignment Request messaging. At 344, the HNB/controller generates a RANAP RAB Assignment Response message that includes the HNB downlink (DL) IP address and an HNB DL GTPU tunnel ID for the HNB for UE downlink communications.

Upon receiving the RAB Assignment Response message at 346, proxy node 50, via offload module 54, can forward the RAB Assignment Response message to SGSN 80 including the HNB DL IP address and the HNB DL GTPU tunnel ID for the HNB, rather than supplying a DL IP address and DL GTPU tunnel ID for proxy node 50 within the RAB Assignment Response messaging. In some embodiments, proxy node 50 can make another determination using decision module 52 as to whether or not to substitute a DL IP address and DL GTPU tunnel ID for proxy node 50 upon receiving RANAP messaging from the HNB/controller (e.g., making another determination based on RANAP message type). In other embodiments, proxy node 50, after previously making the decision to offload the data tunnel following the messaging at 340, can store an association between one or more bearer ID(s) for the previously received RAB Assignment Request and the previous decision to offload the data tunnel for the bearer. In such embodiments, upon receiving the RAB Assignment Response from the HNB/controller, proxy node 50 can query the one or more bearer ID(s) included in the Response to determine that the GTPU tunnel is to be offloaded and can forward the Assignment Response message to SGSN 80 including the HNB DL IP address and HNB DL GTPU tunnel ID. In some embodiments, the one or more bearer ID(s) can further be associated with an ID for a given UE/subscriber (e.g., IMSI). In various embodiments, decision module 52 and/or offload module 54 can perform operations associated with a bearer ID query. As shown at 348, the GTPU tunnel is established between the HNB and the SGSN.

If there is a case in which the UE is involved in a macrocell handover or relocation, for example, if the UE moves from a macrocell to a femtocell or vice-versa, as shown at 324, then SGSN 80 sends an SCCP empty connection request (e.g., containing no SCCP parameters) as shown at 326. At 328, proxy node 50 sends an SCCP connection confirmation to SGSN 80. For the macrocell handover/relocation case, proxy node 50 can still serve as an RTP stream proxy between the HNB/controller and MSC 70. As shown at 350, SGSN 80 communicates a RANAP Relocation Request message to proxy node 50 including the SGSN uplink (UL) IP address and an SGSN UL GTPU tunnel ID for SGSN 80.

Upon receiving the RANAP Relocation Request message, proxy node 50, via decision module 52, determines the type of RANAP message received. For the present example case, the RANAP message type is a Relocation Request, which causes decision module 52 to determine that no data offload path should be established for the GTPU tunnel. Rather proxy node 50 can serve as a proxy for the GTPU tunnel.

At 352, proxy node 50 forwards the RANAP Relocation Request message to the HNB/controller including in the message the UL IP address and UL GTPU tunnel ID for proxy node 50. At 354, the HNB/controller generates a RANAP Relocation Request Acknowledgment (ACK) message that includes the HNB downlink (DL) IP address and an HNB DL GTPU tunnel ID for the HNB.

Upon receiving the RANAP Relocation Request ACK message at 356, proxy node 50 forwards the RANAP Relocation Request ACK message to SGSN 80 including the DL IP address and the DL GTPU tunnel ID for proxy node 50. In some embodiments, proxy node 50 can make another determination using decision module 52 as to whether or not to substitute the DL IP address and DL GTPU tunnel ID for proxy node 50 upon receiving RANAP messaging from the HNB/controller (e.g., making another determination based on RANAP message type). In other embodiments, proxy node 50, after previously making the decision to not offload the data stream following the messaging at 350 can store an association between one or more bearer ID(s) included in the RANAP Relocation Request and the previous decision not to offload the GTPU tunnel for the bearer. In such embodiments, upon receiving the RANAP Relocation Request ACK from the HNB/controller, proxy node 50 can query the one or more bearer ID(s) for the Relocation Request ACK message to determine that the GTPU tunnel is not to be offloaded and can forward the Relocation Request ACK message to SGSN 80 including the DL IP address and DL GTPU tunnel ID for proxy node 50. In some embodiments, one or more bearer ID(s) can further be associated with an ID for a given UE/subscriber (e.g., IMSI). In various embodiments, decision module 52 and/or offload module 54 can perform operations associated with a bearer ID query. As shown at 358, a GTPU tunnel is established between the HNB and the proxy node and at 360 a GTP tunnel is established between the proxy node and the SGSN.

For either an offload case or a non-offload case, the standards-based messaging can continue at 370 in which RANAP direct transfer messaging is communicated from SGSN 80 to proxy node 50 and further from proxy node 50 to the HNB/controller at 372 to either indicate activation for a PDP context acceptance or indicate completion of the UE relocation.

When proxy node 50 is in a controller-based enterprise architecture, F2M and M2F handovers are triggered as part of a relocation request, whereas F2F handover related messages do not reach proxy node 50 as they are handled locally at controller 22. As shown in FIGS. 2A-2B and 3A-3B, whenever proxy node 50 receives relocation request messages, then a GTPU or RTP tunnel is created via proxy node 50 as part of this request handling. Thus for relocation scenarios, proxy node 50 creates a proxy between controller 22, proxy node 50, MSC 70 (e.g., for CS calls), and/or SGSN 80 (e.g., for PS data sessions). In Normal CS/PS cases (e.g., non-handover/relocation cases), proxy node 50 offloads an RTP data stream or GTPU tunnel by not providing its tunnel parameters to controller 22. Instead, proxy node 50 provides the tunnel parameters of the MSC 70 or SGSN 80, depending on CS or PS data plane traffic, respectively, to controller 22. Thus, a direct data path can be created between controller 22 and the MSC 70 or the SGSN 80 for CS or PS data plane traffic, respectively.

In at least one embodiment, decision module 52 of proxy node 50 is associated with operations for determining whether to offload data, and offload module 54 is associated with operations for causing the data plane traffic to be offloaded and to bypass proxy node 50. It will be apparent, however, that these modules may be combined or separated in any number of ways and this is merely an illustration of on possible embodiment. Also, as used herein, 'tunnel identifier' is intended to mean any parameter that serves as an identifier of a communications tunnel, which may be a secure communications tunnel, where the parameter can be recognized by an appropriate network element. Examples include, but are not limited to an identifier of a GTPU tunnel, an RTP port number of an RTP tunnel, etc.

Architecture 10 is an enabling piece of underlying infrastructure that runs 3G and LTE small cells. Proxy node 50 allows smart, selective offloading of a data path in an enterprise controller-based small cell deployment. By creating a selective data offload, service providers do not have to bring all network traffic through a proxy node (e.g., HNB-GW), but can direct it to existing macro cell infrastructure. Consequently, a heterogeneous network (HET-NET) infrastructure (e.g., an infrastructure in which macrocells, femtocells, Wi-Fi access points, combinations thereof or the like are deployed in overlapping geographic areas) can be more easily scaled. At least one embodiment disclosed herein is configured to offload most data traffic that normally goes to proxy node 50, and create a faster path with fewer hops for the offloaded data plane traffic. This can significantly increase the capacity of proxy node 50, while improving network latency and throughput. Additional capacity in proxy node 50 can create new opportunities for effective virtualization of functions performed by proxy node 50. The benefits are achieved with changes only to the proxy node, and therefore, there is no functional impact on HNB or core network (e.g., MSC, SGSN) since existing interfaces can be used.

TABLE 1, shown below, illustrates example results for a test simulation based on a 3G controller based enterprise call model in which measurements for HNB capacity and central processing unit (CPU) consumption are illustrated for a first 'standard' virtualized HNB-GW not configured to provide data path offloading and for a second improved virtualized HNB-GW configured to provide data path offloading. As referred to herein, a 'virtualized' network element (e.g., an HNB-GW, security gateway, etc.) is an emulation of the network element operating on a computer system and/or computing platform based on real or hypothetical architecture and functions of the network element, with particular embodiments involving specialized hardware, software, or a combination of both. In various embodiments, a virtualized network may execute via a hypervisor-based virtualization or a container-based virtualization of a server (e.g., blade server, rack server including a number of blade servers, etc.)

using the server's hardware (e.g., processor and memory) and/or operating system for a given virtualized network environment.

The test simulation for the results shown in TABLE 1 includes various assumptions. For example, measurements regarding CPU consumption assume a traffic load for one thousand (1000) HNBs. Measurements regarding HNB capacity (e.g., number of HNBs that could be supported for a given virtualized HNB-GW) assume in a first case that each virtualized HNB-GW operate within a hardware/software environment of one Cisco Unified Computing System (UCS) blade server. Measurements regarding HNB capacity (e.g., number of HNBs that could be supported for a given virtualized HNB-GW) assume in a second case that a hardware/software environment of a Cisco UCS B-Series eight (8) blade chassis is provided, in which case. For the second case, the number of virtualized HNB-GWs and security gateways (SecGWs) that can be supported for the standard configuration and the improved configuration differs in addition to the number of HNBs that can be supported.

The test simulation further includes various assumptions for the 3G controller-based enterprise call model, including, among others: 1000 controllers are present, with each controller capable of supporting twenty (20) HNBs; 1000 subscribers are present within a coverage area for each controller; an operator's subscriber penetration is 40%; and the percent of active data users per operator is 75%. Other assumptions include, among others: a CS call duration of 300 seconds; a 46% rate of CS MO calls per subscriber; a 54% rate of CS MT calls per subscriber; a PS throughput for each controller of 30 megabits per second (Mbps); a 0.11 ratio of UL to DL PS data; 7% of CS calls involve a handover to a macrocell; 1.85% of PS calls involve handover to a macrocell; that each subscriber receives, on average, 2.5 MT Short Messaging Service (SMS) messages per session; and each subscriber sends, on overage, 0.5 MO SMS messages per session.

TABLE 1

VIRTUALIZED HNB-GW SIMULATION RESULTS

|  | VIRTUALIZED HNB-GW WITH NO DATA PATH OFFLOADING | VIRTUALIZED HNB-GW WITH DATA PATH OFFLOADING |
|---|---|---|
| CPU CONSUMPTION (1000 HNB TRAFFIC LOAD) | 43% | 6% |
| HNB CAPACITY (1 UCS BLADE) | 1,000 | 20,000 |
| HNB CAPACITY (UCS B-SERIES 8 BLADE CHASSIS) | 4000 (3G) (4 SecGW, 4 HNBGW) | 20,000 (7 SecGW, 1 HNBGW) |

As shown in TABLE 1 and based on the assumptions discussed above, the HNB capacity that can be provided for a virtualized HNB-GW configured to provide data path offloading can increase twenty (20) times in comparison to the HNB capacity for a virtualized HNB-GW that does not provide data path offloading. Moreover, the CPU consumption for a virtualized HNB-GW configured to provide data path offloading can decrease approximately seven (7) times in comparison to the CPU consumption for a virtualized HNB-GW that does not provide data path offloading. Accordingly, various improvements can be achieved using data path offloading for an HNB-GW.

Figure 4:
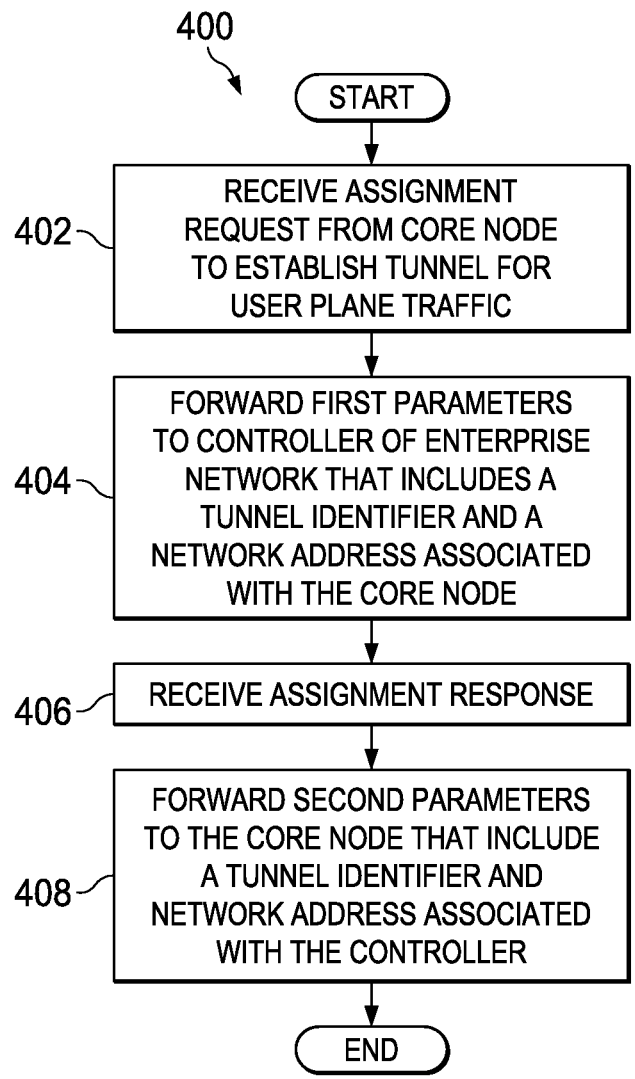
FIG. 4 is a simplified flow diagram illustrating example operations that can be associated with selectively offloading data plane traffic in accordance with at least one embodiment.

Turning to FIG. 4, FIG. 4 is a simplified flow diagram illustrating example operations 400 that can be associated with selectively offloading data plane traffic in accordance with at least one embodiment. At any time proxy node 50 can receive RANAP messaging from a core node (e.g., MSC 70 or SGSN 80). Thus, operations can begin at 402 in which proxy node 50 receives an Assignment Request (e.g., a RAB Assignment Request) from the core node to establish a tunnel for user plane traffic. At 404, proxy node 50 forwards first parameters to the controller 22 of the enterprise network 20. The first parameters can include a tunnel identifier (e.g., an UL RTP port ID (e.g., number) or an UL GTPU tunnel ID) and a network address (e.g., an UL IP address) associated with the core node.

At 406, proxy node 50 receives an assignment response from the controller 22. At 408, proxy node 50 forwards second parameters to the core node. The second parameters can include a tunnel identifier (e.g., a DL RTP port ID or a DL GTPU tunnel ID) and a network address (e.g., a DL IP address) associated with the controller 22 and the operations can end.

Figure 5:
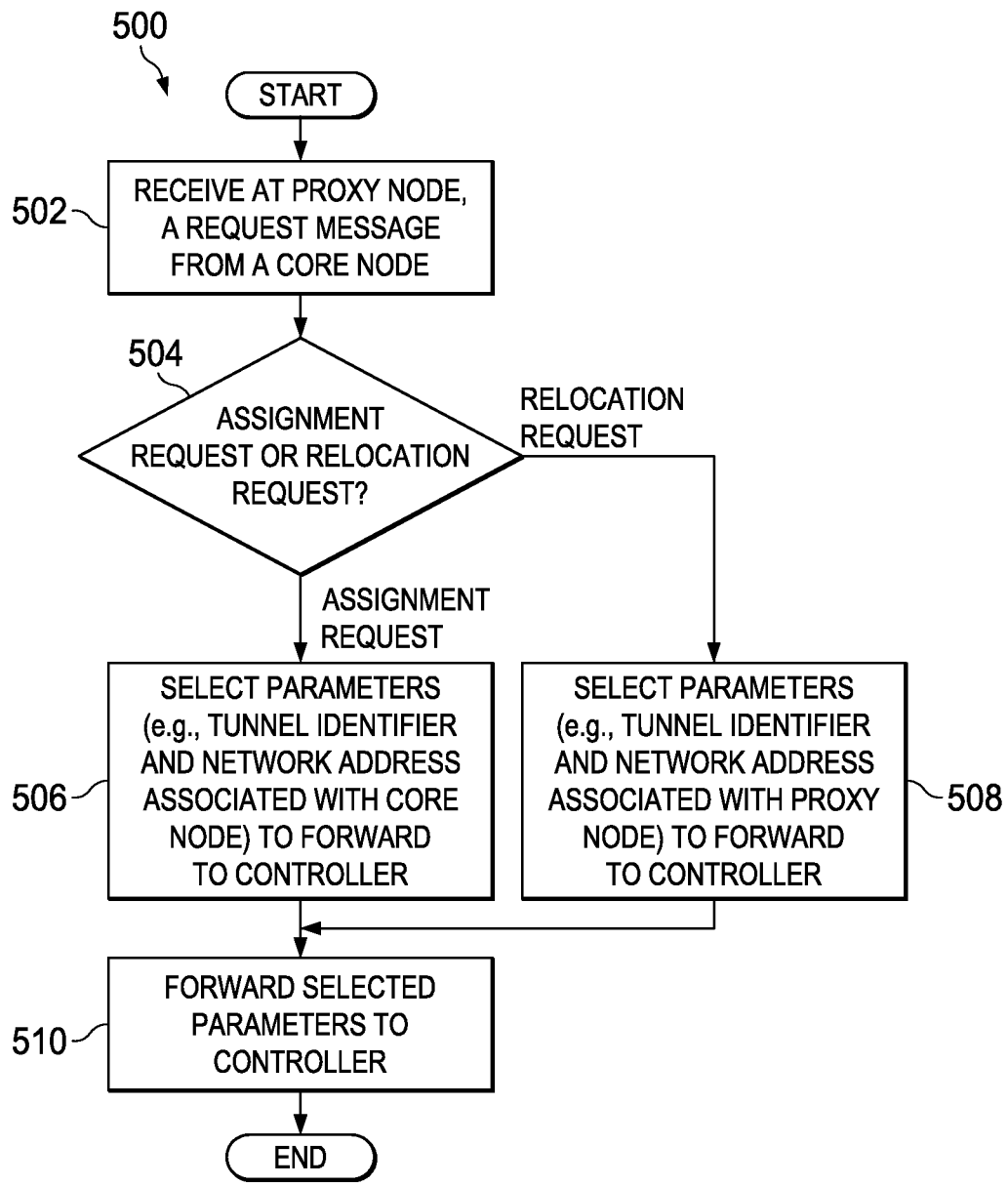
FIG. 5 is a simplified flow diagram illustrating other example operations that can be associated with selectively offloading data plane traffic in accordance with at least one embodiment.

Turning to FIG. 5, FIG. 5 is a simplified flow diagram illustrating example operations 500 that can be associated with selectively offloading data plane traffic in accordance with at least one embodiment. At any time proxy node 50 can receive RANAP messaging from a core node (e.g., MSC 70 or SGSN 80). Thus, operations can begin at 502 in which proxy node 50 receives a request message from the core node. At 504, proxy node 50 can determine whether the request message is an assignment request message or a relocation request message.

If proxy node 50 determines at 504 that the request message is an assignment request message, the operations can continue to 506 in which proxy node 50 selects parameters including a tunnel identifier and a network address for the core node to forward to the controller 22. However, if proxy node determines at 504 that the request message is a relocation request message, the operations can continue to 508 in which proxy node 50 selects parameters including a tunnel identifier and a network address for the proxy node 50 to forward to the controller 22. Following either operations 506 or 508, the operations can continue to 510 in which proxy node 50 forwards the selected parameters to the controller 22 and the operations can end.

Variations and Implementations

Within the context of the disclosure, architecture 10 represents a series of points, nodes, or network elements of interconnected communication paths for receiving and sending packets of information that propagate through architecture 10. Architecture 10 offers communication interfaces between sources and/or hosts, and may be any local area network (LAN), virtual local area network (VLAN), wireless local area network (WLAN), virtual private network (VPN), metropolitan area network (MAN), wide area network (WAN) such as the Internet, Intranet, Extranet, or any other appropriate architecture or system that facilitates communications in a network environment depending on the network topology. Architecture 10 can comprise any number of hardware and/or software elements coupled to (and in communication with) each other through a communication medium. Communication mediums may include any suitable communication link such as wireless technologies (e.g., IEEE 802.11x, 802.16, Wi-Fi, near field communication (NFC), DSRC, etc.), satellite, cellular technologies (e.g., 3G, 4G, WiMAX/LTE, GSM/WCDMA/HSPA, CDMA1x/

EVDO, etc.), wire line technologies (e.g., Ethernet) or any suitable combination thereof. Generally, any suitable means of communication may be used: electric, sound, light, infrared, or radio.

Communications in a network environment are referred to herein as 'network traffic' or 'traffic', which may be inclusive of packets. A packet is a formatted unit of data, and can contain both control information (e.g., source and destination addresses, etc.) and data, which is also known as payload. Network traffic can be sent and received according to any suitable communication messaging protocols. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, replies, queries, etc. are forms of network traffic, and therefore, may comprise packets.

As used herein, the term 'network element' or 'network device' is meant to encompass any of the aforementioned elements, as well as proxy nodes, gateways, controllers, routers, wireless LAN controllers (WLC) switches, wireless access points (WAPs), bridges, loadbalancers, appliances, firewalls, servers, processors, modules (any of which may be physical or virtually implemented on physical hardware) or any other suitable device, component, element, proprietary appliance, or object that is operable to exchange information in a network environment. A network element or network device may include any suitable hardware, software, components, modules, interfaces, or objects that facilitate the operations thereof. This may be inclusive of appropriate algorithms and communication protocols that allow for the effective exchange of data or information.

In at least one example implementation, nodes, network elements, etc. with selective data offloading capabilities include logic to achieve (or to foster) the activities as outlined herein. Note that in at least one example, each of these elements can have an internal structure (e.g., processor 57, memory 59, network interface cards, etc.) to facilitate at least some of the operations described herein. In some embodiments, these activities may be executed externally to these elements, or included in some other network element to achieve this intended functionality. In at least one embodiment these nodes may include logic (or reciprocating logic) that can coordinate with other network elements in order to achieve the operations, as outlined herein. Furthermore, one or several devices may include any suitable algorithms, hardware, firmware, software, components, modules, interfaces, or objects that facilitate the operations thereof.

In certain example implementations, the selective data offloading functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by one or more processors or other similar machine, instructions in software, hardware, firmware, or any combination thereof, etc.). This tangible media may be non-transitory in at least one embodiment. In some of these instances, one or more memory elements can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements) can include memory for storing information to be used in achieving the selective data offloading features, as outlined herein. Additionally, these network elements may include at least one processor (e.g., processor 57) that can execute software, an algorithm, or other instructions to perform the selective data offloading operations, as disclosed herein. These network elements may further keep information, to be used in achieving the selective data offloading activities as discussed herein, in any suitable memory element (random access memory (RAM), read only memory (ROM), EPROM, EEPROM, ASIC, etc.), software, hardware, or in any other suitable component, device, element, or object where appropriate and based on particular needs. Any of the memory items discussed herein (e.g., repositories, stores, databases, tables, caches, buffers, etc.) should be construed as being encompassed within the broad terms 'memory' or 'memory element'. Similarly, any of the potential processing elements, modules, and machines described herein should be construed as being encompassed within the broad term 'processor.' Each of the network elements can also include suitable interfaces for receiving, transmitting, and/or otherwise communicating data or information in a network environment.

Note that the term 'user device', 'user equipment' or 'mobile station' as used herein is intended to be inclusive of any type of computer device that can establish a network session with another node. This includes any type of user equipment, desktop, laptop, mobile Internet device, smart phone, tablet, personal digital assistant (PDA), terminal computer, or any other device, component, element, endpoint, or object capable of initiating voice, audio, video, media, or data exchanges within architecture 10. Such devices may also be inclusive of a suitable interface to the human user, such as a display element, a keyboard, a touchpad, a touch screen (including a multi-touch screen), a remote control, or any other terminal equipment.

Note that in this Specification, references to various features (e.g., elements, structures, modules, components, steps, operations, characteristics, etc.) included in 'one embodiment', 'example embodiment', 'certain embodiment', 'an embodiment', 'another embodiment', 'some embodiments', 'various embodiments', 'other embodiments', 'certain embodiments', 'alternative embodiment', and the like are intended to mean that any such features and improvements are included in one or more embodiments of the present disclosure, but may or may not necessarily be combined in the same embodiments.

Note that with the examples provided herein, interaction may be described in terms of two or more network elements. However, this has been done for purposes of clarity and example only. In certain cases, it may be easier to describe one or more of the functionalities of a given set of flows by only referencing a limited number of network elements. It should be appreciated that the systems and architecture described herein are readily scalable and can accommodate a large number of components, as well as more complicated/sophisticated arrangements and configurations. Accordingly, the examples provided should not limit the scope or inhibit the broad teachings of the selective data offloading features as potentially applied to a myriad of other architectures or implementations.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

It is also important to note that the activities, interactions, and operations shown and described herein illustrate only some of the possible scenarios and patterns that may be executed by, or within, the nodes with selective data offloading capabilities. Some of these activities, interactions, and/or operations may be deleted or removed where appropriate, or may be modified or changed considerably without departing from the scope of the present disclosure. In addition, a number of these activities, interactions, and/or operations have been described as being executed concurrently with, or in parallel to, one or more additional activities, interactions, and/or operations. However, the timing of these activities, interactions, and/or operations may be altered considerably. The preceding operational flows have been offered for purposes of example and discussion. Substantial flexibility is provided by nodes with selective data offloading capabilities in that any suitable arrangements, chronologies, configurations, and timing mechanisms may be provided without departing from the teachings of the present disclosure. Additionally, these activities can be facilitated by various modules and/or components which can be suitably combined in any appropriate manner, or partitioned in any appropriate manner, and which may be based on particular configuration and/or provisioning needs.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although embodiments herein have been illustrated with reference to particular elements and protocols, these elements and protocols may be replaced by any suitable architecture, protocols, and/or processes that achieve the intended functionality of nodes with selective data offloading capabilities as disclosed herein.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that architecture 10 (and its teachings) are readily scalable and can accommodate a large number of components, as well as more complicated/sophisticated arrangements and configurations. Accordingly, the examples provided should not limit the scope or inhibit the broad teachings of architecture 10 as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving a first request message from a core node in a network at a small cell gateway (HNB-GW) in the network;
determining that the first request message is not a relocation request indicating a handover between a macrocell and a femtocell;
determining to offload data plane traffic from the HNB-GW, based on the determining that the first request message is not a relocation request indicating a handover between a macrocell and a femtocell;
establishing a first network tunnel to the core node bypassing the HNB-GW, based on the determining to offload data traffic from the HNB-GW, wherein establishing the first tunnel comprises:
  determining first parameters comprising a first tunnel identifier for the first network tunnel and a first network address associated with an endpoint of the first network tunnel, wherein the first network address is associated with the core node; and
  forwarding the first parameters to a controller of an enterprise network comprising a plurality of access points, a plurality of user devices, and the controller, wherein the controller is configured to handle handover between femtocells in the enterprise network;
receiving a second request message from the network at the HNB-GW in the network;
determining that the second request message comprises a relocation request indicating a handover between a macrocell and a femtocell, and in response establishing a second network tunnel to the HNB-GW, wherein establishing the second tunnel comprises:
  determining second parameters comprising a second tunnel identifier for the second network tunnel and a second network address associated with an endpoint for the second network tunnel, wherein the second network address is associated with the HNB-GW; and forwarding the second parameters to the controller of the enterprise network.

2. The method of claim 1, wherein the first request message is to establish the tunnel for user plane data traffic.

3. The method of claim 2, wherein the core node is a Serving General Packet Radio Service Support Node (SGSN).

4. The method claim 1, wherein the first request message is to establish the tunnel for user plane voice traffic.

5. The method of claim 4, wherein the core node is a Mobile Switching Center (MSC).

6. The method of claim 1, wherein the tunnel identifier and the network address are included in the first request message.

7. The method of claim 1, wherein the first request message is a Radio Access Bearer (RAB) Release Request.

8. The method of claim 1, wherein the first request message comprises an assignment request and the second request message comprises a relocation request.

9. The method of claim 1, further comprising:
receiving an assignment response, and in response forwarding third parameters to the core node, wherein the third parameters include a third tunnel identifier and a third network address associated with the controller.

10. An apparatus, comprising:
at least one processor coupled to at least one memory; and
an offload module that when executed by the at least one processor is configured to:
receive a first request message from a core node in a network at a small cell gateway (HNB-GW) in the network;
determine that the first request message is not a relocation request indicating a handover between a macrocell and a femtocell;
determine to offload data plane traffic from the HNB-GW, based on the determining that the first request message is not a relocation request indicating a handover between a macrocell and a femtocell;
establish a first network tunnel to the core node bypassing the HNB-GW, based on the determining to offload data traffic from the HNB-GW, wherein establishing the first tunnel comprises:
determining first parameters comprising a first tunnel identifier for the first network tunnel and a first network address associated with an endpoint of the first network tunnel, wherein the first network address is associated with the core node; and
forwarding the first parameters to a controller of an enterprise network comprising a plurality of access points, a plurality of user devices, and the controller, wherein the controller is configured to handle handover between femtocells in the enterprise network;
receive a second request message from the network at the HNB-GW in the network;
determine that the second request message comprises a relocation request indicating a handover between a macrocell and a femtocell, and in response establish a second network tunnel to the HNB-GW, wherein establishing the second tunnel comprises:
determining second parameters comprising a second tunnel identifier for the second network tunnel and a second network address associated with an endpoint for the second network tunnel, wherein the second network address is associated with the HNB-GW; and forwarding the second parameters to the controller of the enterprise network.

11. The apparatus of claim 10, wherein the first request message is to establish the tunnel for user plane data traffic.

12. The apparatus of claim 11, wherein the core node is a Serving General Packet Radio Service Support Node (SGSN).

13. The apparatus of claim 10, wherein the first request message is to establish the tunnel for user plane voice traffic.

14. The apparatus of claim 13, wherein the core node is a Mobile Switching Center (MSC).

15. The apparatus of claim 10, wherein the tunnel identifier and the network address are included in the first request message.

16. The apparatus of claim 10, wherein the first request message comprises an assignment request and the second request message comprises a relocation request.

17. The apparatus of claim 10, wherein the offload module is further configured to:
receive an assignment response, and in response forward third parameters to the core node, wherein the third parameters include a third tunnel identifier and a third network address associated with the controller.

18. At least one non-transitory, machine readable storage medium having instructions stored therein, the instructions when executed by at least one processor configured to cause the at least one processor to:
receive a first request message from a core node in a network at a small cell gateway (HNB-GW) in the network;
determine that the first request message is not a relocation request indicating a handover between a macrocell and a femtocell;
determine to offload data plane traffic from the HNB-GW, based on the determining that the first request message is not a relocation request indicating a handover between a macrocell and a femtocell;
establish a first network tunnel to the core node bypassing the HNB-GW, based on the determining to offload data traffic from the HNB-GW, wherein establishing the first tunnel comprises
determining first parameters comprising a first tunnel identifier for the first network tunnel and a first network address associated with an endpoint of the first network tunnel, wherein the first network address is associated with the core node; and
forwarding the first parameters to a controller of an enterprise network comprising a plurality of access points, a plurality of user devices, and the controller, wherein the controller is configured to handle handover between femtocells in the enterprise network;
receive a second request message from the network at the HNB-GW in the network;
determine that the second request message comprises a relocation request indicating a handover between a macrocell and a femtocell, and in response establish a second network tunnel to the HNB-GW, wherein establishing the second tunnel comprises:
determining second parameters comprising a second tunnel identifier for the second network tunnel and a second network address associated with an endpoint for the second network tunnel, wherein the second network address is associated with the HNB-GW; and forwarding the second parameters to the controller of the enterprise network.

19. The medium of claim 18, wherein the first message comprises an assignment request and the second message comprises a relocation request and wherein the first request message is one of:
   a request to establish the tunnel for user plane data traffic; and
   a request to establish the tunnel for user plane voice traffic.

20. The medium of claim 18, wherein the instructions are further configured to:
   receive an assignment response, and in response forward third parameters to the core node, wherein the third parameters include a third tunnel identifier and a third network address associated with the controller.

* * * * *